United States Patent [19]

Lee

[11] Patent Number: 4,617,058

[45] Date of Patent: Oct. 14, 1986

[54] PROCESS FOR PRODUCING BLACKBOARD CRAYON

[76] Inventor: Seung J. Lee, 86-3, Hyomok-dong, Dong-ku, Daegu 635, Rep. of Korea

[21] Appl. No.: 776,166

[22] Filed: Sep. 10, 1985

[30] Foreign Application Priority Data

Jan. 12, 1984 [KR] Rep. of Korea .................... 1984-165

[51] Int. Cl.$^4$ .............................................. C09D 13/60
[52] U.S. Cl. ........................................ 106/19; 106/23; 106/27; 106/28; 106/31; 106/308 F
[58] Field of Search ....................... 106/19, 23, 27, 28, 106/31, 308 F

[56] References Cited

U.S. PATENT DOCUMENTS

| | | | |
|---|---|---|---|
| 3,491,043 | 1/1970 | Zmitrovis | 106/19 |
| 4,193,906 | 3/1980 | Hatanaka | 106/19 |
| 4,212,676 | 7/1980 | Ueda | 106/19 |
| 4,256,494 | 3/1981 | Yamamoto et al. | 106/23 |
| 4,382,819 | 5/1983 | Berghofer | 106/19 |
| 4,525,214 | 6/1985 | Panken | 106/19 |
| 4,545,819 | 10/1985 | Shioi et al. | 106/23 |

FOREIGN PATENT DOCUMENTS 42-6545   3/1967 Japan .
52-130723 11/1977 Japan .

*Primary Examiner*—Paul Liberman
*Assistant Examiner*—Willie J. Thompson
*Attorney, Agent, or Firm*—Oblon, Fisher, Spivak, McClelland & Maier

[57] ABSTRACT

A process for producing blackboard crayon by molding a mixture of calcium carbonate, titanium oxide and zinc oxide in place of conventional calcined gypsum or chalk, a resinous material primarily containing paraffin, beef tallow or palm oil as a coagulant, and a solvent, into a stick form. The blackboard crayon does not scatter dust.

9 Claims, No Drawings

PROCESS FOR PRODUCING BLACKBOARD CRAYON

DESCRIPTION

1. Technical Field

The present invention relates to process for making a new kind of chalk for use in writing or drawing on the blackboard, and more precisely for making blackboard crayon (hereinafter referred to the blackboard crayon) which can replace the usual chalk.

2. Background of Art

In a typical manufacturing process, the usual chalk in the bar shape is produced by tempering and drying the calcined gypsum or chalkstone in the mold and sometimes various kinds of pigments are added for the purpose of coloring. Though the traditional chalk has been used very widely for a long time, it has some defects. It is apt to produce troublesome powder when we write letters with it on the blackboard and the powder is scattered not only near the blackboard but also in the air. When you erase letters on the blackboard, the situation gets worse. It is said that the usual chalk is a source of contamination of our surroundings and moreover harmful to our health, especially to the respiratory organs such as the lungs.

The object of the present invention is to provide a process for producing the blackboard crayon, the powder of which does not blow off in the air, by improving the properties of the usual chalk.

It is another object of this invention to prepare some new coagulants which offer good binding properties for the crayon material comprising calcium carbonate, titanium oxide, etc. in producing the blackboard crayon in the shape of the conventional chalk.

DISCLOSURE OF THE INVENTION

In the present invention, the calcined gypsum or the chalkstone used in making the conventional chalk is replaced by the mixture of the inorganic powder-like materials such as calcium carbonate, titanium oxide and zinc oxide (hereinafter referred to crayon material), and a resinous coagulant, which is based on paraffin or beef tallow or palm oil as main ingredients, is provided to bind the mixture of the inorganic materials. The main ingredients of the coagulant of this invention are inexpensive and easily available in the market.

The present invention also has an object to develop a new process in forming the crayon. According to this invention, the crayons are formed by extrusion molding method, cut in adequate lengthes, dried and cooled at the room temperature while the conventional chalks are formed and hardened in the respective mold cavities, pulled out from the mold and dried for a quite long time.

BEST MODES FOR CARRYING OUT THE INVENTION

The present invention will be described in detail according to some embodiments below.

The process for making the crayon of this invention consists of two steps; the first step is the production of the resinous coagulants and the second one is that the resinous coagulant is, immediately after being made, added to the crayon material and the mixture is extrusion-molded as the crayon.

In the first step of the process of this invention, two kinds of coagulant are prepared and they will now be described by way of example with reference to a practical embodiments.

EXAMPLE OF THE FIRST COAGULANT

Paraffin, hardened oil, surface active agent and 3% glycerine solution can be used as ingredients with the following weight percentage. Other types of glycerine can undoubtedly be used in different mixing ratios.

| Paraffin | 70% |
| --- | --- |
| hardened oil | 15% |
| surface active agent | 10% |
| 3% glycerine solution | 5% |

All the above-said ingredients are stirred and mixed up at the temperature of 80° C. in the presence of nickel or copper catalyst in an agitator, which is equipped with a pair of rotating gears engaging with one another. After agitating of about two hours with the speed of rotating gears of 100 rpm, the mixture is reacted to a resinous material soluble in hydrophillic or hydrophobic solvents. In this process, both liquid and solid paraffin can be used, hardened oil from both animal and vegetable oil is useful and also all kinds of surface active agent can be applied.

EXAMPLE OF THE SECOND COAGULANT

Beff tallow or palm oil, sodium hydroxide, magnesium oxide, surface active agent and water is mixed up with the following weight percentage.

| beef tallow or palm oil | 65% |
| --- | --- |
| sodium hydroxide | 10% |
| magnesium oxide | 5% |
| surface active agent | 5% |
| water | 15% |

All the above ingredients are agitated at the temperature of 80° C. in the presence of zinc catalyst in an agitator as the same in the case of the first coagulant and then the mixture is also reacted to a resinous material soluble in hydrophillic or hydrophobic solvents.

Reaction in preparing the first coagulant is thought as the condensation reaction between carboxyl group (—COOH) in hardened oil and hydroxy group(—OH) in glycerine as follows;

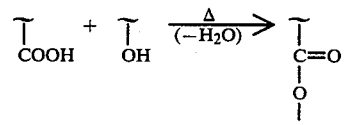

In case of the second coagulant, it is expected that the saponification reaction occurs between carboxyl group (—COOH) in beef tallow or palm oil and sodium hydroxide. The degree of saponification plays a controlling role in the viscosity of the coagulant along with magnesium oxide. Magnesium oxide will be physically bounded with carboxyl group as follows;

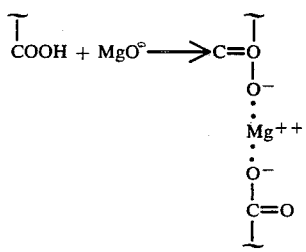

The condition in agitating the ingredients of the coagulant vary as the temperature changes from 70° C. up to 100° C., the speed of rotating gears from 90 rpm to 140 rpm and the time of agitating from 1.5 hours up to 3 hours according to the change of the composition of the coagulants.

The produced coagulants are immediately mixed up with the crayon material, which consists of calcium carbonate 70%, titanium oxide 15% and zinc oxide 15%, in the volume ratio of one to one (1:1), and the appropriated quantity of solvent is added to the above mixture in an extrusion molder. Thereafter, the last mixture is extrusion-molded to the bar-shape crayons which are cut in desired lengthes, dried and cooled at the room temperature on the cooling conveyor in order to be wrapped for marketing.

The two types coagulants can be mixed individually with the crayon material, while they can also be applied in a mixed state of proper ratio. In the above example, the chalk material had the particle size of 500 meshes, the solvents added to the mixture of crayon material and the coagulant were from hydrocarbons made in petroleum industry and the quantity of them was about ten (10) percent by weight on the basis of the total materials. Further, the pressure and the temperature in extrusion-forming process were 330 kg/cm$^2$ and 90° C. respectively.

However, it is observed in the present invention that the conditions in extrusion-forming vary in the temperature range from 70° C. to 100° C., in the pressure range from 250 kg/cm$^2$ to 400 kg/cm$^2$ with the change of composition of coagulants and crayon material. The particle size of crayon material is preferred to be in the range of 400 mesh to 600 mesh.

The manufacturing conditions for the crayons of this invention are not restricted to those of examples described in the above. The mixing ratios of the crayon material and coagulant, or the first coagulant and second one, the kind or quantity of solvents, and the pressure and the temperature in extruder can be changed properly by those who are skilled in the art.

CAPABILITY OF EXPLOITATION IN INDUSTRY

The crayons of this invention can be produced from the materials easily available through the comparatively simple process and have good properties even at the low temperatures while they keep the proper hardness at the room tempererature. Moreover, the crayons of this invention do not break to powder and give no source of contamination of our environments and accordingly they are harmless to the user in contrast with the usual chalks.

The blackboards for the crayon of this invention are desired to be coated with paints based on synthetic polymers. The marks or letters made by the chalk of this invention can be more easily removed by an eraser for which a Korean utility model application was filed by the applicant.

I claim:

1. Process for producing blackboard crayon comprising the first step wherein the first coagulant is made from the mixture of paraffin, hardened oil, surface active agent and 3% glycerine solution, or the second coagulant from the mixture of beef tallow or palm oil, sodium hydroxide, magnesium oxide, surface active agent and water, and the second step wherein one of the first or the second coagulant or mixture of the two coagulants is, immediately after being made, mixed with the crayon material which is the mixture of calcium carbonate, titanium oxide and zinc oxide, and a solvent in order to be extrusion-molded as crayons.

2. The process according to claim 1, wherein the first coagulant is made from the mixture consisting of 70-80 wt. % of paraffin, 5-15 wt. % of hardened oil, 5-10 wt. % of surface active agent and 5-10 wt. % of 3% glycerine.

3. The process according to claim 1, wherein the second coagulant is made from the mixture consisting of 65-75 wt. % of beef tallow or palm oil, 5-15 wt. % of surface active agent and 10-15 wt. % of water.

4. The process according to claim 1, wherein crayon material comprises 70-85 wt. % of calcium carbonate, 10-20 wt. % of titanium oxide and 10-20 wt. % of zinc oxide.

5. The process according to claim 1, wherein the crayon material is mixed with one of the first coagulant or the second one or the mixture of the first and second ones in the volume ratio of one to one (1:1) and then a solvent, corresponding to 10 weight % of the mixture of the coagulant and the crayon material, is added.

6. The process according to claim 2 or 3, wherein the coagulant is made by agitating for 1.5-3 hours at the agitating speed of 90-140 rpm and at a temperature of 70°-100° C.

7. The process according to claim 4, wherein the particle sizes of the crayon material are from 400 to 600 mesh.

8. The process according to claim 5 or 7, wherein the extrusion pressure and extrusion temperature are 250-400 Kg/cm$^2$ and 70°-100° C. respectively.

9. The process according to claim 6, wherein the first coagulant is made in the presence of nickel or copper catalyst, while the second coagulant is made in the presence of zinc catalyst.

* * * * *